March 27, 1928.
D. FILLIER
1,664,027
ELECTRIC FLYTRAP
Filed Jan. 6, 1925
2 Sheets-Sheet 1
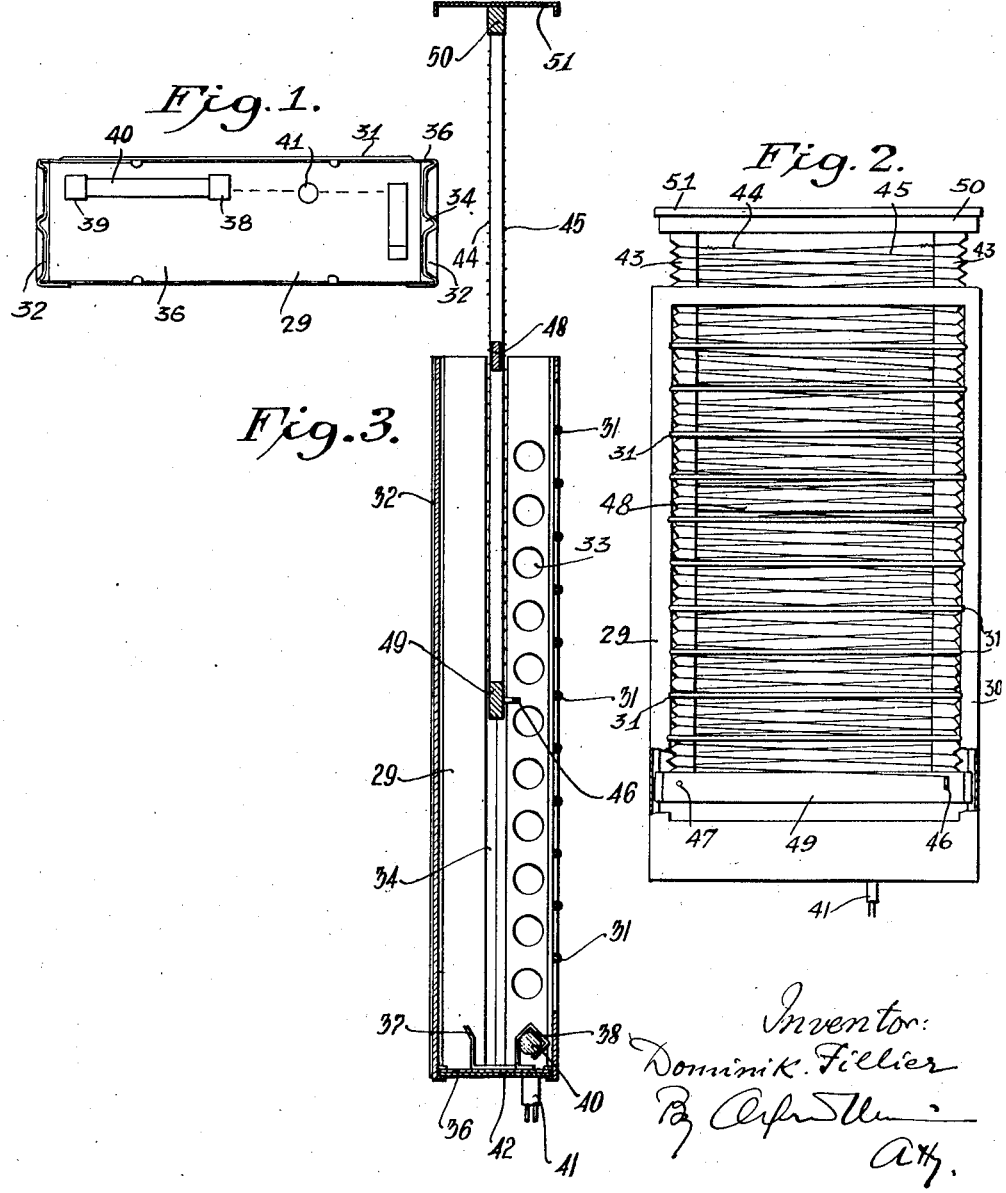

Patented Mar. 27, 1928.

1,664,027

UNITED STATES PATENT OFFICE.

DOMINIK FILLIER, OF VIENNA, AUSTRIA.

ELECTRIC FLYTRAP.

Application filed January 6, 1925, Serial No. 771, and in Austria August 4, 1924.

My invention relates to insect traps especially to fly traps of the type in which the insect to be trapped closes an electric circuit between conductors when reaching the trap and is thus electrocuted.

According to the present invention, the conducting wires which are connected to the two poles of a source of electric current are wound on an insulating frame, which may be slid into a protecting frame and easily and safely withdrawn therefrom for cleaning purposes, as the current, upon the withdrawal of the insulating frame is interrupted, without being switched off.

Figure 5:
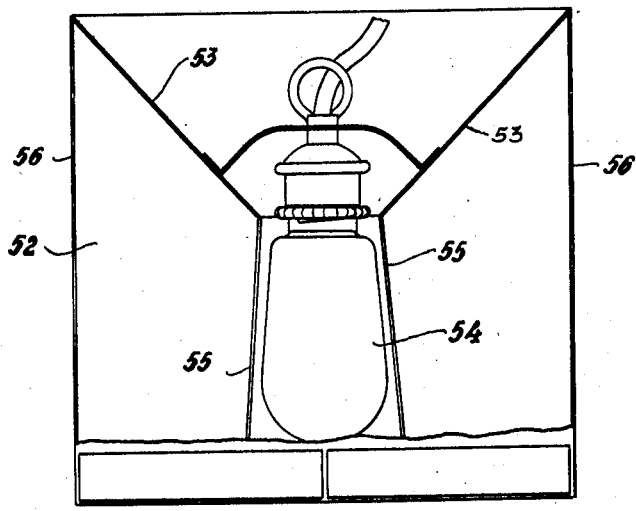
Figure 6:
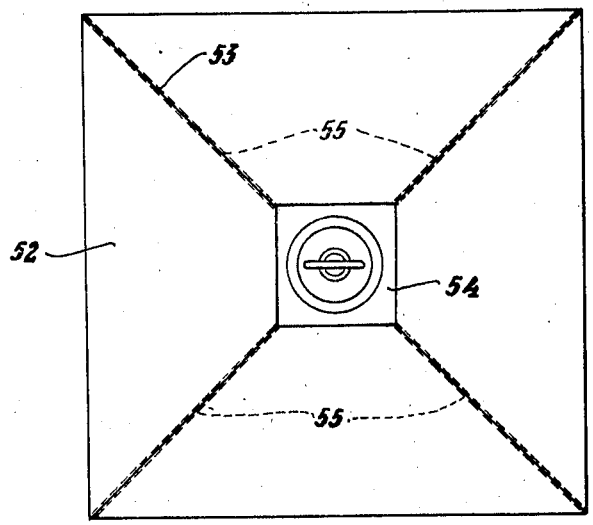

In the accompanying drawing the fly-trap according to my invention is illustrated by way of example in various modifications. Fig. 1 shows one embodiment of the invention in front view. Figs. 2 and 3 illustrate the same with the trapping frame drawn out in plan and longitudinal section respectively. Fig. 4 shows another modification in vertical section. Figs. 5 and 6 respectively show a special embodiment suitable for trapping mosquitos and the like, in a front view, partly in section, and in plan view.

In the embodiment illustrated in Figs. 1 to 3, 29 indicates a casing open at the front and at the top and is provided with openings 30 for the flies to pass through, which openings are separated by bars 31 having buffed edges, because it is a well-known fact that flies do not alight on round surfaces. The basing is on both sides enclosed by walls 32 provided with openings 33 also for the purpose of letting the flies pass through, and with longitudinal channels 34 acting as a guide for a trapping frame 35 to be inserted. At the rear is a wall 36 of insulating material carrying three contact springs 37, 38 and 39 (Fig. 1). The latter are shaped so as to carry a resistance rod 40 of high electrical resistance which lowers the voltage.

Through an opening in the wall 36 passes a conducting cable 41 which is connected with a plug at its free end. A protecting wall 42 is arranged on the outer surface of the wall 36, both the latter and the protecting wall being held by the ends of the side walls 32 which are turned over. Into the said casing is inserted the trap frame of fire proof insulating material having recesses in its longitudinal side portions 43 for lodging the windings of two parallel wires 44 and 45 which are fastened on the one hand at the edge of the trap frame in the first recesses at opposite sides of the frame on the other hand to contact pins 46 and 47 respectively, the latter being symmetrically arranged one on the upper the other on the lower surface of the frame so as to secure the closing of the circuit by the contact springs 37 and 39 even when the frame is turned round for 180°. A stiffening bar 48 is arranged in the middle of the frame. The longitudinal side portions 43 of the frame, the front portion 49 thereof and the stiffening bar 48 are made of insulating material, the rear portion 50 and rear wall 51 which also closes the casing when the trap frame is in its place within the casing, are made of sheet metal or some other material. The front and rear portions 49 and 50 project on both sides over the longitudinal portions 43 and are thus guided in the channels 34 in such a manner that neither the frame itself nor the wires wound thereon will come into contact with the metallic casing. It is obvious that the conductors of the frame will only carry current, when the trap frame is completely inserted into the casing so that the contact pins 46 and 47 are in abutment with the contact springs 37 and 39 respectively.

The fly trap above described may form a portion of a cover (Fig. 4) adapted to be placed over a plate 18 carrying food as indicated at 19 in Fig. 4, the food in this case acting at the same time as a bait for the flies.

For trapping insects which swarm at night, for instance, mosquitos and the like, I use a casing (see Figs. 5 and 6), the cover 53 of which is sloping towards the centre. An incandescent lamp 54 extends through said cover. From the top edges of the outer casing walls 55 extend inwardly toward the lamp. Openings 56 through which the insects are to enter are arranged in the outer walls of the casing in such a manner that the insects will knock against the inclined faces of the cover or against the walls 55 and are thus thrown down on the trapping frame as shown in Figs. 1–3, which frame is disposed below the lamp 54. If several adjacent frames be used, the series resistance may be a common one.

Instead of using sheet metal I may as well use any other fire proof material for instance porcelain, clay or the like, for making the casing shown in any of the figures.

I claim as my invention:

1. In an electric insect trap, the combination with a source of electric current, of an insulating frame, two conducting wires wound on said frame, and a protecting frame adapted to receive said insulating frame, means on said protecting frame for establishing an electric connection between each of said conducting wires wound upon said insulating frame and one of the poles of said source of current respectively upon said insulating frame being completely inserted in said protecting frame, the circuit between said conducting wires being closed by an insect when touching two wires.

2. The combination as specified in claim 1, in which said protecting frame comprises a casing open at the front and provided in its walls with openings and with bars having buffed edges separating said openings.

3. The combination as specified in claim 1, in which said protecting frame comprises a casing open at the front and provided in its walls with openings and with bars having buffed edges separating said openings, the transverse portions of said insulating frame projecting beyond the side portions thereof and forming a means for guiding said frame in said casing.

4. The combination as specified in claim 1, comprising two contact pins provided at the front edge of said insulating frame for securing thereto the conducting wires, and contact springs on said protecting frame to cooperate with said pins.

5. The combination as specified in claim 1, comprising two contact pins provided at the front edge of said insulating frame for securing thereto the conducting wires, and contact springs on said protecting frame to cooperate with said pins, said contact pins being symmetrically arranged on the top and bottom surface of said insulating frame to permit said frame to be turned about its axis through 180°.

6. The combination as specified in claim 1, comprising contact pins provided on said insulated frame, and contact springs provided on said protecting frame, the rear wall of the latter being made of fire-proof material and provided with an opening for the conducting cable.

7. The combination as claimed in claim 1, in which said protecting frame comprises a casing, contact springs secured thereto, and a cover provided on the rear wall of said casing to cover the means for securing said contact spring, the said cover and rear wall being held by the overturned ends of the side wall of the casing.

8. The combination of a container including electric terminals and provided interiorly with channels juxtaposed in spaced relation, of an insulating structure having edges slidably insertible into said channels, said structure including distinct wires adapted for electrical connection with said terminals respectively while leaving the circuit open unless connection be made across said wires, some sections of one of said wires extending alongside certain sections of the other wire at a distance therefrom according to the size of noxious insects which it is intended to coax to passage therebetween, other sections of said wires respectively crossing yet out of contact with each other whereby to achieve a double likelihood of insects coming in contact simultaneously with sections of distinct wires.

9. In a device of the character described, the combination of an open receptacle provided at its inner end with a pair of electrical terminals alined from side to side, a symmetrical frame adapted for insertion into said container and carrying a pair of terminals, and wires wound laterally back and forth across said frame and connectible one with each of said frame terminals, the arrangement of the parts when said frame is in one of its reversibly inserted positions being so contrived that said wires are spaced both from the top and from the bottom of said receptacle.

10. In combination for the purpose of electrocuting noxious insects, an insulating frame fashioned on opposite sides with predeterminably spaced serrations, electrical terminals thereon, a pair of wires strung crosswise of said frame, occupying said serrations and each connected with only one of said terminals, a container intended to be supplied with an insect lure and provided with a pair of electrical terminals connectible with a source of current and adapted yieldingly to contact said first mentioned terminals respectively.

11. In combination for the purpose of electrocuting noxious insects, an insulating frame, electrical terminals each projecting in opposite directions from one end thereof, a pair of wires each repeatedly strung crosswise of said frame and each connected with only one of said terminals, a container intended to be supplied with an insect lure and provided at one end with a pair of leaf spring terminals connectible with a source of current and adapted to be engaged and yield upon contact by said first mentioned terminals respectively when said frame is introduced into said container, the relation of said pairs of terminals being so arranged as to permit of contact upon insertion of said frame in reversed positions.

12. In combination for the purpose of electrocuting noxious insects, a frame, electrical terminals thereon, a pair of wires each repeatedly strung around said frame and each connected with only one of said terminals, sections of said wires on the same side of said frame being alternately arranged, an open container interiorly provided on opposite sides with channels adapted to be occupied by opposite edges of said frame, said container also provided with a pair of electrical terminals connectible with a source of current and adapted to contact said first mentioned terminals respectively when said frame is introduced into said container, said wires being spaced from the bottom of said container, the arrangement being such that any adjacent pair of wires considered in either of two relatively transverse directions will, if simultaneously touched by an insert, effect a closing of the electrical circuit.

13. In combination for the purpose of electrocuting noxious insects, a frame, electrical terminals thereon, a pair of wires each repeatedly strung around said frame and each connected with only one of said terminals, the arrangement being such that adjacent sections of wire in any one plane belong to distinct wires and that sections of the two distinct wires cross each other, an open container provided with a pair of electrical terminals adapted to be contacted by the terminals on said frame respectively when the latter is inserted in said container, the arrangement being such that any adjacent pair of sections of wire considered in either of two relatively transverse directions will, if simultaneously touched by an insect, effect a closing of the electrical circuit.

In testimony whereof I affix my signature.

DOMINIK FILLIER.